US008579539B2

United States Patent
Finn et al.

(10) Patent No.: US 8,579,539 B2
(45) Date of Patent: Nov. 12, 2013

(54) DAIRY FREESTALL CROSS CLAMP ASSEMBLY

(75) Inventors: Todd Finn, Holland Patent, NY (US); Gale Burdick, Poland, NY (US); Doug Eckhoff, Maple Plain, MN (US)

(73) Assignee: GEA Farm Technologies, Inc., Naperville, IL (US)

(*) Notice: Subject to any disclaimer, the term of this patent is extended or adjusted under 35 U.S.C. 154(b) by 0 days.

(21) Appl. No.: 12/804,571

(22) Filed: Jul. 23, 2010

(65) Prior Publication Data

US 2011/0103888 A1     May 5, 2011

Related U.S. Application Data

(60) Provisional application No. 61/273,889, filed on Aug. 10, 2009.

(51) Int. Cl.
     *B25G 3/36*       (2006.01)

(52) U.S. Cl.
     USPC ............ 403/390; 403/400; 403/394; 119/523

(58) Field of Classification Search
     USPC ......... 403/335, 385, 386, 390, 394, 396, 400; 119/523
     See application file for complete search history.

(56) References Cited

U.S. PATENT DOCUMENTS

| | | | | | |
|---|---|---|---|---|---|
| 1,835,338 | A | * | 12/1931 | Rossman | 403/385 |
| 2,020,102 | A | * | 11/1935 | Burton et al. | 403/385 |
| 2,164,022 | A | * | 6/1939 | Rowe | 439/175 |
| 2,179,516 | A | * | 11/1939 | Patrick | 403/394 |
| 2,182,151 | A | * | 12/1939 | Hofmann | 439/785 |
| 2,787,775 | A | * | 4/1957 | Sorflaten et al. | 439/785 |
| 2,894,773 | A | * | 7/1959 | Noe | 403/385 |
| 4,311,407 | A | * | 1/1982 | Doyle | 403/390 |
| 4,475,843 | A | * | 10/1984 | Wyler | 403/394 |
| 4,536,102 | A | * | 8/1985 | Doyle | 403/390 |
| 5,111,770 | A | * | 5/1992 | Weelink | 119/523 |
| 6,786,672 | B2 | * | 9/2004 | Ledingham | 403/400 |
| 7,469,658 | B2 | * | 12/2008 | Moreau | 119/516 |

\* cited by examiner

*Primary Examiner* — Joshua Kennedy
(74) *Attorney, Agent, or Firm* — Smith Law Office

(57) ABSTRACT

A dairy animal freestall cross clamp assembly including a first clamp portion defining a first recess, the first recess having a first axis; a second clamp portion releasably joined to the first clamp portion and defining a second recess, the second recess having a second axis that is not parallel to and intersects with the first axis; and an insert disposed between and joined to the first clamp portion and the second clamp portion, the insert defining a first pocket opposing the first recess, and a second pocket for opposing the second recess. The insert can be resilient to avoid crushing of rail members and resist impact loads.

6 Claims, 3 Drawing Sheets

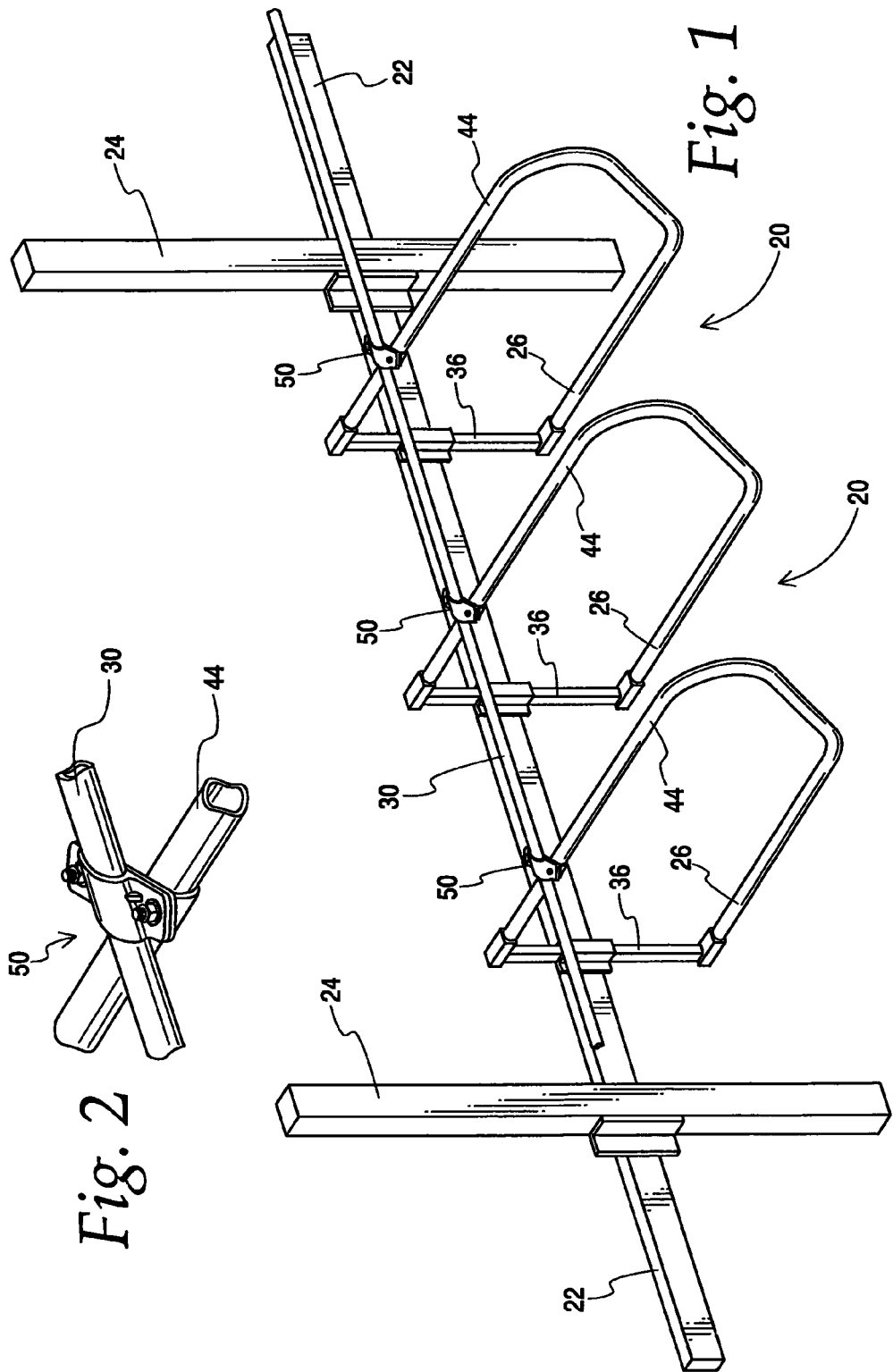

DAIRY FREESTALL CROSS CLAMP ASSEMBLY

This application claims the benefit of Provisional Application No. 61/273,889 filed Aug. 10, 2009, the disclosure of which is incorporated by reference herein.

FIELD AND BACKGROUND OF THE INVENTION

The invention relates to freestalls in dairies, and more particularly to a cross clamp assembly for joining freestall rails.

Dairies use a cow housing style called freestalls that make dairies more efficient and manageable. Freestalls are clean and spacious areas for cows to rest. Freestalls generally include one closed end, one entry end (closed or open), and two sides. The freestall floor is at least partially surrounded by a manure curb and lined with appropriate bedding. Freestalls are sized to take into consideration body space, head space, and lunge space needed for a cow.

The freestall sides can be joined to a common support member such as a beam that is used to support other freestalls. The common support member defines the freestall closed end. To position a cow in a stall, neck rails extending from side-to-side are used toward the back of the freestall so that there is adequate room for the cow to enter the stall, stand inside the manure curb, and to lie down.

Many freestall components are tubular and may be square, rectangular or round in cross-section. The components are joined to one another with connectors, such as clamps. Cross clamps are used to join some freestall components, such as neck rails and stall sides. One type of cross clamp includes top and bottom halves joined by four nut and bolt assemblies to maintain the components at desired angles to one another. These clamps require two wrenches to tighten the nuts and bolts. Overtightening of cross clamps can crush the tubular members. Under-tightening can result in a loose fit that can be moved or damaged by animals using the stall.

When a cow impacts a neck rail, for example, a torque is applied to the clamp that is resisted by the bolts. When the torque is high enough, the bolts can bend or break, or the nuts can loosen.

It is common for neck rails to be moved back and forward, up and down, within a freestall to accommodate different sized animals. To move the neck rail, two wrenches must be used and care must be taken to tighten the bolts so as not to crush the rails or to be overly loose. Once a rail is crushed, it may be difficult to move the neck rail back to that location.

Thus, a freestall component connector is needed that is simple to use, maintains freestall components at desired angles, and can be tightened properly.

SUMMARY OF THE INVENTION

The present invention is relatively simple to use, includes few parts, maintains freestall components at desired angles relative to one another, and reduces the chance that rails will be crushed or the clamp will be too loose.

A cross clamp assembly in accordance with the present invention includes a first clamp portion defining a first recess, the first recess having a first axis; a second clamp portion releasably joined to the first clamp portion and defining a second recess, the second recess having a second axis that is not parallel to and intersects with the first axis; and an insert disposed between and joined to the first clamp portion and the second clamp portion, the insert defining a first pocket opposing the first recess, and a second pocket for opposing the second recess. The insert can be resilient so that rails are not crushed and yet a secure connection is formed. The insert can also include indexing steps that orient the first clamp half at a desired angle to the second clamp half.

The cross clamp assembly first pocket and the first tubular recess can define a substantially cylindrical opening, and the second pocket and the second tubular recess can define a substantially cylindrical opening. The cross clamp assembly first axis can be disposed at about a 90° angle to the second axis so that connected rails will extend 90° from one another.

The cross clamp assembly first clamp portion and second clamp portion can be releasably joined together with two bolts with mating nuts and washers or other suitable connectors. One of the connector portions can include a hex-shaped recess that captures a bolt head so that only one wrench is necessary to tighten the nut.

BRIEF DESCRIPTION OF THE DRAWINGS

FIG. 1 is a partial perspective view of two freestalls incorporating a cross clamp assembly in accordance with the present invention;

FIG. 2 is a perspective view of a cross clamp assembly in accordance with the present invention joining two freestall components;

DETAILED DESCRIPTION OF THE INVENTION

Figure 3:
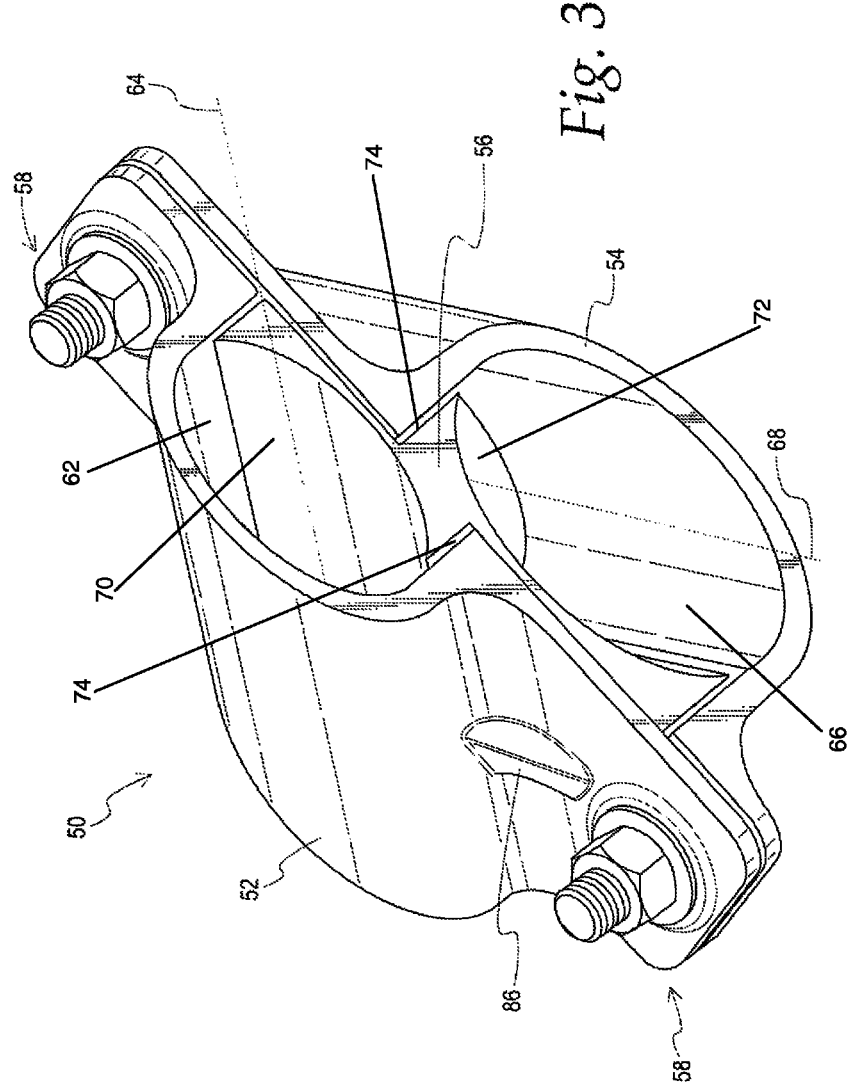
FIG. 3 is a perspective view of the cross clamp assembly of the present invention.
Figure 4:
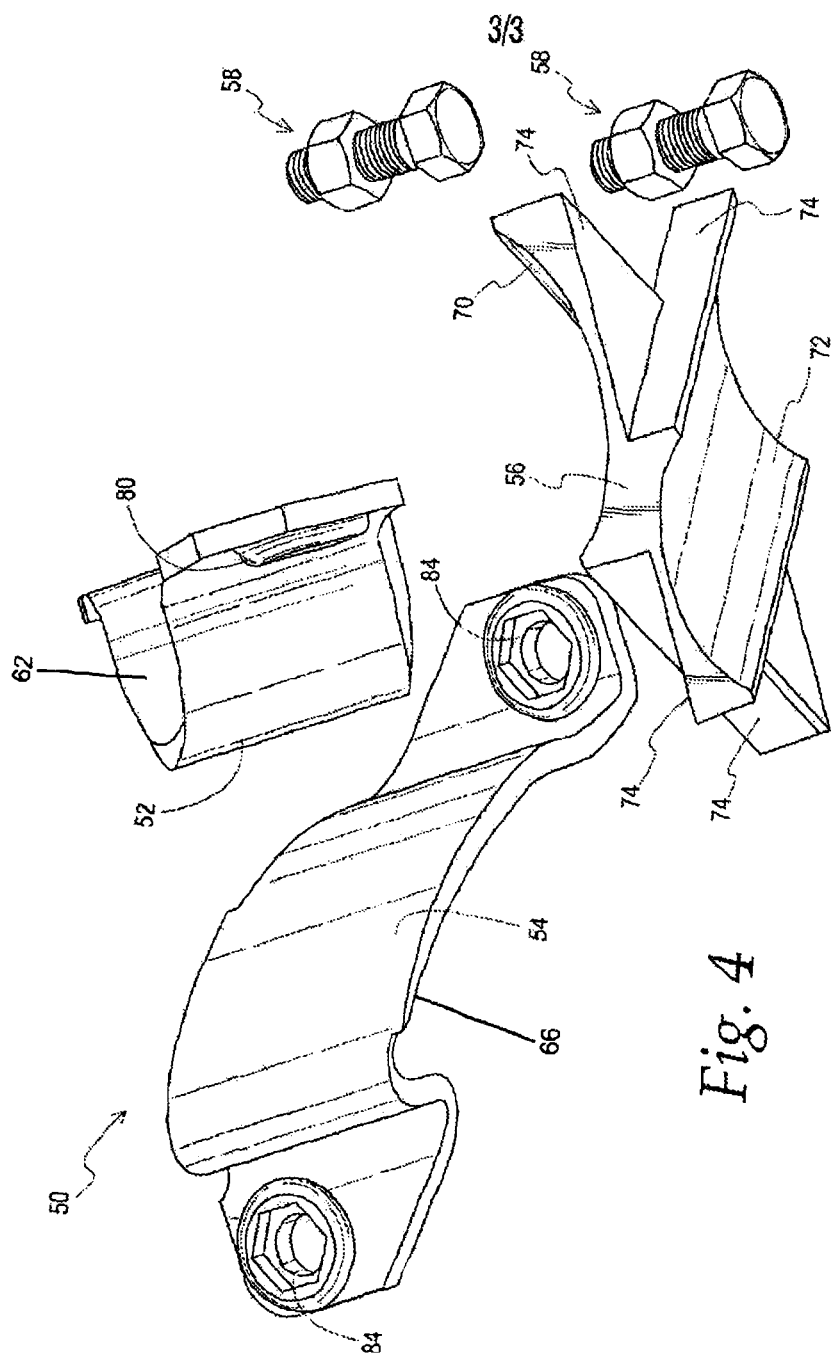
FIG. 4 is an exploded perspective view of the cross clamp assembly.

FIG. 1 illustrates two freestalls 20 that are defined by a substantially horizontal single beam 22 supported by posts 24, sides 26, and a neck rail 30. The beam 22 is illustrated as a single beam, but a wall, multiple beams, or other structure can be used. Further, beams can be any shape and size and can be supported by the posts 24 or any suitable column, wall, or other structure and be within the scope of this invention. More than one beam 22 can be used. The beam 22 and posts 24 can be joined by brackets that are welded, bolted, screwed, nailed or other suitable means to the beam 22 and/or posts 24.

FIG. 1 illustrates two freestalls 20 that are defined by a substantially horizontal single beam 22 supported by posts 24, sides 26, and a neck rail 30. The beam 22 is illustrated as a single beam, but a wall, multiple beams, or other structure can be used. Further, beams can be any shape and size and can be supported by the posts 24 or any suitable column, wall, or other structure and be within the scope of this invention. More than one beam 22 can be used. The beam 22 and posts 24 can be joined by brackets that are welded, bolted, screwed, nailed or other suitable means to the beam 22 and/or posts 24.

The stall sides 26 can be of any suitable shape and construction, but preferably include a vertical standpipe 36 joined to the beam 22 with nuts and bolts, brackets, screws or other suitable means. The freestall sides 26 are preferably made of round tubes bent to any desired shape, such as illustrated in FIG. 1, but other shapes can be used. The freestall side 26 is joined to the standpipe 36 with any appropriate bracket, weld, or other means.

The freestall sides 26 preferably include a top rail 44 that is substantially horizontal, but other orientations can be used. A neck rail 30 extends laterally across the freestall 20 and should be securely joined to the top rail 44. To do so, a cross clamp assembly 50 in accordance with the present invention is used.

The cross clamp assembly 50 includes a first clamp portion 52, a second clamp portion 54, an insert 56, and pairs of nuts and bolts 58. The first clamp portion 52 defines a first recess 62, and the first recess 62 defines a first axis 64. Similarly, the second clamp portion 54 defines a second recess 66 that defines a second axis 68. The first axis 64 and the second axis 68 are not parallel because they define the orientations of the freestall top rail 44 and the neck rail 30 relative to one another. Preferably, the angle between the first axis 64 and the second axis 68 is about 90°, but other angles can be used to accommodate installation conditions.

As stated above, the cross clamp assembly 50 also includes an insert 56 sandwiched between the first clamp portion 52 and the second clamp portion 54. The insert 56 defines a first pocket 70 opposing the first recess 62 in which a portion of the top rail 44 or neck rail 30 will be secured. Similarly, the insert 56 defines a second pocket 72 opposing the second recess 66 in which a portion of the top rail 44 or neck rail 30 will be secured. The size and shape of the pockets are selected to match the size and shape of the rails to be joined. This matching of size and shape reduces the chances for crushing rails and ensures proper tightening of the cross clamp 50.

To further aid in preventing rail crushing, the insert 56 is preferably resilient so that the insert 56 compresses when the cross clamp 50 is tightened instead of the rails being crushed. The degree of resiliency depends on the size, shape, and materials used for the rails. Nonetheless, a combination of about 50% native rubber and about 50% polyurethane provides acceptable results. A Durometer of about 70 Shore A is adequate, but others in the range of Durometer 40 Shore A to 80 Shore A can be used. Other resilient materials can be used as well.

The insert 56 also includes steps 74 that mate with and align the clamp portions 22/24. One or both of the steps 74 can be formed at any predetermined angle to index the first clamp portion 52 to the second clamp portion 54 and thereby define the angle between the first axis and the second axis. The steps 74 can be formed integrally with the insert 56 or they can be joined in another suitable manner. The steps 74 and resiliency of the insert 56 adds strength to the cross clamp 20 by carrying loads that tend to torque the neck rail 30 relative to the stall side top rail 44. This results in less rail damage, fewer connectors, and some resiliency in the cross clamp 50.

The first clamp portion 52 and the second clamp portion 54 are releasably joined to one another with connectors that are preferably a pair of nut and bolt combinations 58. Washers 82 can be used as well and/or raised portion 80 of the clamp portions provides reinforcement.

The clamp portion that receives the bolt head preferably includes a hex-shaped recess 84 in which the bolt head is captured. The recess 84 simplifies installation because only one wrench is necessary to tighten the nut.

Preferably, the clamp portions 22/24 are made of cast steel. A reinforcing rib 86 can be formed on the casting. Other materials can be used as well.

Other embodiments of the invention are possible and within the scope of the following claims.

The invention claimed is:

1. A dairy animal freestall cross clamp assembly comprising:
    a first clamp portion defining a first recess, the first recess having a first axis;
    a second clamp portion joined to the first clamp portion and defining a second recess, the second recess having a second axis arranged at a predetermined angle to the first axis; and
    an insert disposed between the first clamp portion and the second clamp portion, the insert defining a first pocket opposing the first recess and defining a second pocket opposing the second recess, wherein the insert is resilient and defines an indexing step extending into the first recess and engaging the first clamp portion to transfer torsional loads therebetween and to at least partially define the predetermined angle between the first axis and the second axis.

2. The dairy animal freestall cross clamp assembly of claim 1, wherein:
    the resilient insert has a Durometer in the range of about 40 Shore A to about 80 Shore A.

3. The dairy animal freestall cross clamp assembly of claim 1, wherein the first pocket and the first recess define a substantially tubular opening, and the second pocket and the second recess define a substantially tubular opening.

4. The dairy animal freestall cross clamp assembly of claim 1, wherein the first pocket and the first recess define a substantially cylindrical opening.

5. The dairy animal freestall cross clamp assembly of claim 1, wherein the first clamp portion and the second clamp portion are releasably joined together with two bolts, and the first clamp portion defines two bolt head recesses and each bolt head recess receives a corresponding bolt head.

6. The dairy animal freestall cross clamp assembly of claim 1, wherein the insert further defines a second indexing step engaging the second recess to at least partially define the predetermined angle between the first axis and the second axis.

* * * * *